United States Patent
Droux et al.

(10) Patent No.: US 7,716,730 B1
(45) Date of Patent: May 11, 2010

(54) CRYPTOGRAPHIC OFFLOAD USING TNICS

(75) Inventors: Nicolas G. Droux, San Jose, CA (US);
Sunay Tripathi, San Jose, CA (US);
Thirumalai Srinivasan, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1306 days.

(21) Appl. No.: 11/165,870

(22) Filed: Jun. 24, 2005

(51) Int. Cl.
*G06F 9/00* (2006.01)
*G06F 11/30* (2006.01)
*H04L 29/06* (2006.01)
*G06F 9/46* (2006.01)

(52) U.S. Cl. .......................... 726/14; 713/153; 713/189

(58) Field of Classification Search .................. 726/14
See application file for complete search history.

(56) References Cited

U.S. PATENT DOCUMENTS

2005/0135412 A1* 6/2005 Fan ........................ 370/463

2006/0104308 A1* 5/2006 Pinkerton et al. ........... 370/469

FOREIGN PATENT DOCUMENTS

WO    WO 9964952 A1 * 12/1999

OTHER PUBLICATIONS

Cristian Coarfa, Peter Druschel, Dan S. Wallach, "Performance analysis of TLS Web servers", Feb. 2006, Transactions on Computer Systems (TOCS), vol. 24 Issue 1, pp. 39-69.*

* cited by examiner

*Primary Examiner*—Emmanuel L Moise
*Assistant Examiner*—Courtney D Fields
(74) *Attorney, Agent, or Firm*—Osha • Liang LLP (57) ABSTRACT

A method for offloading a secure protocol connection, involving establishing the secure protocol connection between a host system and a remote peer, offloading the secure protocol connection to a network interface card (NIC) to obtain an offloaded secure protocol connection, determining whether a packet is associated with the offloaded secure protocol connection, and if the packet is associated with the offloaded secure protocol connection, identifying the offloaded secure protocol connection, performing cryptographic operations on the packet using at least one secret key to obtain a processed packet, and returning a status of the processed packet to the host system.

16 Claims, 4 Drawing Sheets

CRYPTOGRAPHIC OFFLOAD USING TNICS

CROSS REFERENCE TO RELATED APPLICATIONS

The present application contains subject matter that may be related to the subject matter of the application with U.S. application Ser. No. 10/884,791 entitled "Fast Connection Offload" and, filed on Jul. 1, 2004, and assigned to the assignee of the present application, and U.S. Application entitled "Secure Protocol Handshake Offload Using TNICs" and with Ser. No. 11/165,990 filed on Jun. 24, 2005.

BACKGROUND

Conventionally employed computer systems commonly use both a Transmission Control Protocol (TCP) and an Internet Protocol (IP) processing layer to facilitate the transmission and receipt of data over a network system. Further, Network Interface Cards (NICs) are commonly used to enable computers to connect to a network. With the steadily increasing volume and rates of data transfer, processing at the TCP/IP layers can burden a system. To address this issue, network interface cards (NICs) have been designed that are capable of processing TCP protocol in hardware (i.e., TNICs). Using TNICs, the processing of message streams can be offloaded onto the TCP/IP layers of the TNIC, resulting in a reduced processing burden on the CPU of a system.

When secure data is exchanged over a network system, secure protocols, such as Secure Sockets Layer (SSL) and Transport Layer Security (TLS), are used to secure web traffic. SSL and TLS make extensive use of encryption to secure the traffic exchanged between two peers in a network system. Communication through SSL/TLS can be divided into two phases: a handshake phase followed by a data transfer phase. During the handshake phase, one peer authenticates with the other peer and exchanges cryptographic keys using public-key cryptography. During the data exchange phase, the peers use the keys to encrypt the traffic to be exchanged between them.

Cryptographic operations using public and private keys are typically compute intensive operations. In order to alleviate the host from performing such operations, cryptographic hardware accelerators are often used to perform cryptographic operations. Typically, cryptographic hardware accelerators are implemented using a proxy or an accelerator card. If a proxy is used, the proxy performs both the SSL/TLS processing as well as the cryptographic processing. Specifically, the proxy communicates with the remote hosts using the SSL/TLS protocols on one side, and the hosts with non-encrypted traffic on the other side. The proxy implements a TCP/IP stack, SSL/TLS functionality, as well as cryptographic hardware capabilities. A proxy can be implemented as a standalone machine, part of a router or switch, or as a add-on card that plugs into a host computer. In a proxy implementation of a cryptographic hardware accelerator, the information carried as part of the original SSL/TLS data becomes unavailable upon reaching the host software that acts on the non-encrypted traffic.

Alternatively, an accelerator card is an add-on card that plugs into a host computer through an input/output (I/O) bus (e.g., peripheral component interconnect (PCI) bus). The SSL/TLS protocol is implemented by the software executing on the host computer, and the cryptographic operations are performed in hardware by the accelerator card. The software component that implements the SSL/TLS protocol typically invokes the cryptographic hardware using e.g., a library, a framework, etc. Because the host software implements the SSL/TLS protocols when using an accelerator card, the SSL/TLS data crosses the 10 bus several times when the data is encrypted or decrypted. For example, when encrypted data is received, the data has to cross the bus once to go from the NIC (or TNIC) to the host memory, to go from the host memory to the accelerator card, and again to go from the accelerator card to host memory in decrypted form.

SUMMARY

In general, in one aspect, the invention relates to a method for offloading a secure protocol connection, comprising establishing the secure protocol connection between a host system and a remote peer, offloading the secure protocol connection to a network interface card (NIC) to obtain an offloaded secure protocol connection, determining whether a packet is associated with the offloaded secure protocol connection, if the packet is associated with the offloaded secure protocol connection identifying the offloaded secure protocol connection, performing cryptographic operations on the packet using at least one secret key to obtain a processed packet, and returning a status of the processed packet to the host system.

In general, in one aspect, the invention relates to a system for offloading a secure protocol connection, comprising a host system configured to obtain an offloaded secure protocol connection by offloading the secure protocol connection to a network interface card (NIC), and the NIC configured to determine whether a packet is associated with the offloaded secure protocol connection, if the packet is associated with the offloaded secure protocol connection identify the offloaded secure protocol connection, perform cryptographic operations on the packet using at least one secret key to obtain a processed packet, and return a status of the processed packet to the host system.

In general, in one aspect, the invention relates to a computer system for offloading a secure protocol connection, comprising a processor, a memory, a storage device, and software instructions stored in the memory for enabling the computer system under control of the processor, to establish the secure protocol connection between a host system and a remote peer, offload the secure protocol connection to a network interface card (NIC) to obtain an offloaded secure protocol connection, determine whether a packet is associated with the offloaded secure protocol connection, if the packet is associated with the offloaded secure protocol connection identify the offloaded secure protocol connection, perform cryptographic operations on the packet using at least one secret key to obtain a processed packet, and return a status of the processed packet to the host system.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to offloading secure protocol processing and cryptographic operations to Network Interface Cards (NICs). Specifically, embodiments of the invention relate to selectively offloading secure protocol connections to a NIC, while still allowing the host software components to access the secure protocol information, where the host system decides whether to offload a particular secure protocol connection.

Figure 1A:
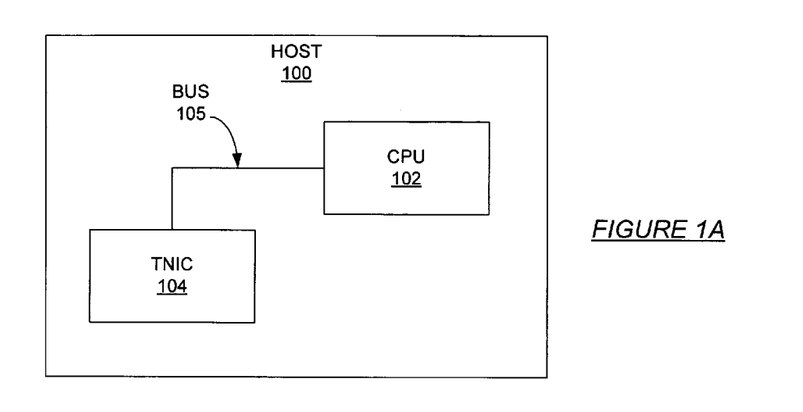
FIG. 1A shows a host system in accordance with one embodiment of the invention.

FIG. 1A shows a system for offloading secure protocol processing to NICs in accordance with one embodiment of the invention. Specifically, the system of FIG. 1A shows a host (100) system including a CPU (102) and a TNIC (104) connected via a bus (105). While FIG. 1A and the remainder of this disclosure discuss the invention with respect to a specific type of NIC (i.e., TNIC), those skilled in the art will appreciate that the invention may be performed using any type of NIC. The system of FIG. 1A is used to perform offloading of a secure protocol connection from the host (100) to the TNIC (104). Those skilled in the art will appreciate that although FIG. 1A only shows one TNIC (104) in the host (100), several TNICs may exist in the host (100), depending on the needs of the host (100).

The host (100) may be any computer system capable of exchanging data with a remote peer. Further, the host (100) may include one or more applications (not shown) (e.g., e-commerce applications) that use a secure protocol to transfer data between the host (100) and one or more remote peers (i.e., computer systems operating remotely over a network) (not shown). The host applications may be running in kernel space or user space.

The CPU (102) includes a TCP/IP stack operating in a system kernel (not shown). Further, the CPU interfaces with the TNIC (104), which receives messages (i.e., packets) from a network (e.g., the Internet, etc.). When the TNIC (104) receives packets from the network, the packets are processed and forwarded to the host (100). In one embodiment of the invention, the TNIC (104) includes a network stack with a TCP layer and an IP layer configured to enable processing of data sent to and received from remote peers. Thus, when the host (100) establishes a TCP connection with one or more remote peers, rather than the host (100) performing TCP/IP processing of packets sent and received, the TNIC (104) provides this processing functionality via the TCP/IP stack implemented on the TNIC (104).

As noted above, the system of FIG. 1A is used to offload secure protocol connections from the host (100) to the TNIC (104). In one embodiment of the invention, the host (100) includes functionality to conduct fast offloading of a connection onto the TNIC (104). Specifically, upon establishing a TCP connection between the host (100) and the remote peer (e.g., by using a handshake procedure to authenticate both ends of the TCP connection), the kernel sends unacknowledged and unsent data from the host (100) to the TNIC (104) (i.e., the TNIC driver (not shown)) as part of the process for initiating an offload to the TNIC. In this manner, the TNIC (104) immediately begins accepting and processing message packets (sent by the remote peer) from the TCP connection before the offload is completely set up (i.e., before the kernel has completed offloading the connection to the TNIC). Additionally, message packets are sent to the remote peer by the TNIC (104) without waiting for the offload process to be completed. Thus, data transmission is occurring simultaneously with the offload set-up process.

Figure 1B:
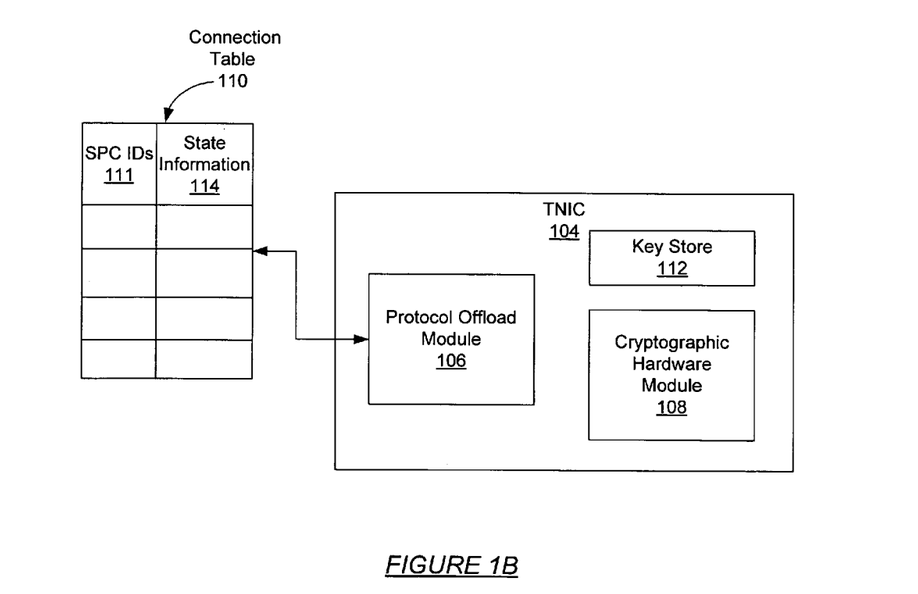
FIG. 1B shows a Transport Network Interface Card (TNIC) in accordance with one embodiment of the invention.

FIG. 1B shows the TNIC (104) in accordance with one embodiment of the invention. In one embodiment of the invention, the TNIC (104) includes a protocol offload module (106), a cryptographic hardware module (108), and a key store (112). The protocol offload module (106) includes functionality to process a protocol connection, such as a TCP connection. In one embodiment of the invention, the protocol offload module (106) also includes functionality to process a secure protocol connection, such as an SSL connection, TLS connection, etc. Specifically, when a packet is transmitted or received by the host (100), the protocol offload module (106) determines which protocol the packet is associated with using a connection table (110). In one embodiment of the invention, the connection table (110) maps secure protocol connection identifications (i.e., SPC IDs (111)) (e.g., the name of the secure protocol connection, a secure protocol ID, port numbers for the secure protocol connection, etc.) with state information (114) associated with the secure protocol connection. In one embodiment of the invention, state information may include a listing of packets in the message stream that have/have not been sent to the remote peer, references or names of cryptographic keys to be used in cryptographic operations for secure protocol connection data, the cryptographic keys themselves, etc. The connection table (110) is populated by the TNIC when a secure protocol connection is offloaded. Those skilled in the art will appreciate that the connection table (110) may be any data structure and is not limited to a table as shown in FIG. 1B.

In one embodiment of the invention, the protocol offload module (106) examines the header information of each transmitted or received packet to obtain a port number and a connection number, and subsequently uses the port number and the connection number to index into the connection table (110) to determine which protocol the packet is associated with. For example, if the protocol is associated with a TCP connection, and the protocol offload module (106) includes capability to process a TCP connection, then the protocol offload module (106) processes the packet based on this information. Alternatively, if the packet is associated with a secure protocol connection, then the protocol module (106) processes the packet (i.e., determines the data on which cryptographic operations are to be performed) and forwards the packet to the cryptographic hardware module (108) on the TNIC, which is capable of performing cryptographic operations on transmitted or received data. In one embodiment of the invention, cryptographic operations performed on the packet data may include encrypting data to be sent over the network, decrypting data received from a remote peer, etc. In one embodiment of the invention, the protocol offload module (106) includes functionality to recognize which algorithms to use for the type of secure protocol connection determined. Those skilled in the art will appreciate that the connection table (110) may be stored within the protocol offload module (106), or may be located elsewhere within the TNIC (104) accessible by the protocol offload module (106). Further, the connection table (110) may include both secure and non-secure protocol connection information. Alternatively, in one embodiment of the invention, multiple connection tables may exist for different protocols handled by the TNIC.

In one embodiment of the invention, the cryptographic hardware module (108) includes cryptographic algorithms for encrypting/decrypting network traffic. Upon receiving packets from the protocol offload module (106), the cryptographic hardware module (108) uses cryptographic algorithms and symmetric cryptographic keys (i.e., secret keys) to perform cryptographic operations on secure protocol data. In one embodiment of the invention, the symmetric keys used by the cryptographic hardware module (108) may be stored on the TNIC (104) in a key store (112). In one embodiment of the invention, the key store may include a table of cryptographic keys (not shown). The table of cryptographic keys may be used by the cryptographic hardware module (108) to look up which cryptographic key to use to encrypt/decrypt secure protocol data. In this case, the host (100), when requesting the TNIC (104) to offload a secure protocol connection, may provide the TNIC (104) with a reference to value to a cryptographic key. The cryptographic hardware module (108) may then use the reference/value to index into the table of cryptographic keys to find the key to be used for a particular cryptographic operation.

Those skilled in the art will appreciate that embodiments of the invention may be performed with a network interface card (NIC) that does not include a TCP/IP stack. Specifically, a secure protocol connection may be offloaded to a NIC (rather than a TNIC), where the NIC includes a protocol offload module capable of processing packets sent/received using secure protocols but not TCP/IP connections, and cryptographic hardware to perform cryptographic operations.

Figure 2:
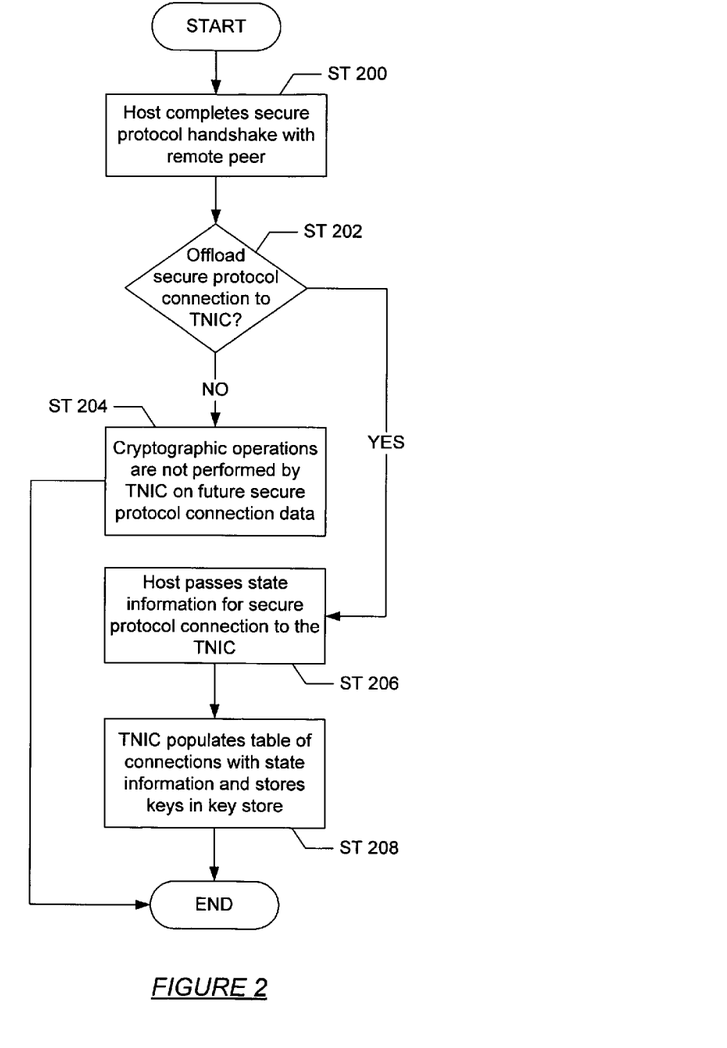
FIG. 2 shows a flow chart for setting up a secure connection offload in accordance with one embodiment of the invention.

FIG. 2 shows a flow chart for setting up the offload of a secure protocol connection from a host to the TNIC in accordance with one embodiment of the invention. Initially, the host establishes a connection by completing a secure protocol handshake with the remote peer (Step 200). Those skilled in the art will appreciate that the secure protocol handshake is performed using handshake methods well known in the art. As a result of the handshake, one or more secret keys are negotiated between the host and the remote peer. In one embodiment of the invention, the secret key(s) are used to perform symmetric cryptographic operations on the secure protocol connection data by the TNIC (described below).

Continuing with FIG. 2, subsequently, a determination is made whether the secure protocol connection is offloaded to the TNIC (Step 202). Specifically, when the host completes the handshake, the host tells the host TCP stack that the symmetric key cryptographic operations for that secure protocol connection should be offloaded to the TNIC. In determining whether to offload the connection to the TNIC, the host may analyze information transmitted during the handshake process (e.g., number of packets in the message stream of the connection, etc.) and determines that the connection is suitable for offloading. In one embodiment of the invention, the host may send a offload request to the TNIC to determine whether the TNIC is capable of handling the secure protocol connection. For example, if the TNIC does not support the particular cryptographic algorithm required in the secure protocol connection, the TNIC does not have access to the cryptographic keys required to perform cryptographic operations on the secure protocol data, etc., then the TNIC may not be capable of handling the offloading of the secure protocol connection, and may reject the host's offload request. In this case, cryptographic operations are not performed by the TNIC for future secure protocol connection data (Step 204).

Alternatively, in one embodiment of the invention, if the TNIC is capable of handling the offloading of the secure protocol connection (i.e., if the TNIC accepts the offload request sent by the host), then the host passes state information associated with the secure protocol connection to the TNIC (Step 206). As described above, state information may include port numbers for the secure protocol connection, a listing of packets in the message stream that have/have not been sent to the remote peer, etc. In one embodiment of the invention, the state information may be provided to the TNIC as part of the offload request.

Upon receiving the state information associated with the secure protocol connection, the TNIC uses the state information to populate the connection table (110 in FIG. 1B) and stores the cryptographic keys (if they are provided by the host) in the key store (112 in FIG. 1B) (Step 208). In one embodiment of the invention, the TNIC populates the table of connections by updating the table of connection with the states of the secure protocol connection provided by the host (i.e., update the table of connections with the correct port numbers associated with the secure protocol connection, etc.). Those skilled in the art will appreciate that the host may send multiple offload requests to the TNIC for different protocol connections (e.g., SSL connection, TCP connection, etc.). Thus, the TNIC may update the table of connection with the states of multiple connections.

Those skilled in the art will appreciate that, as described above, the host offloads the secure protocol connection using fast connection offload. Thus, the TNIC may begin receiving and accepting message packets from the secure protocol connection before the offload is completely set up. In one embodiment of the invention, along with the offload request sent by the host to the TNIC, the host (i.e., the kernel of the host) sends already transmitted data (e.g., unacknowledged TCP data) and unsent data that is to be sent to the remote peer. In this manner, the packets that would otherwise be queued until offload set-up is complete are immediately processed by the TNIC without waiting for the offload process to complete.

At this stage, the set-up procedure for offloading a secure protocol connection is complete. In one embodiment of the invention, if the handshake between the host and the remote peer completes successfully, then a corresponding status is passed back to the host application.

Figure 3:
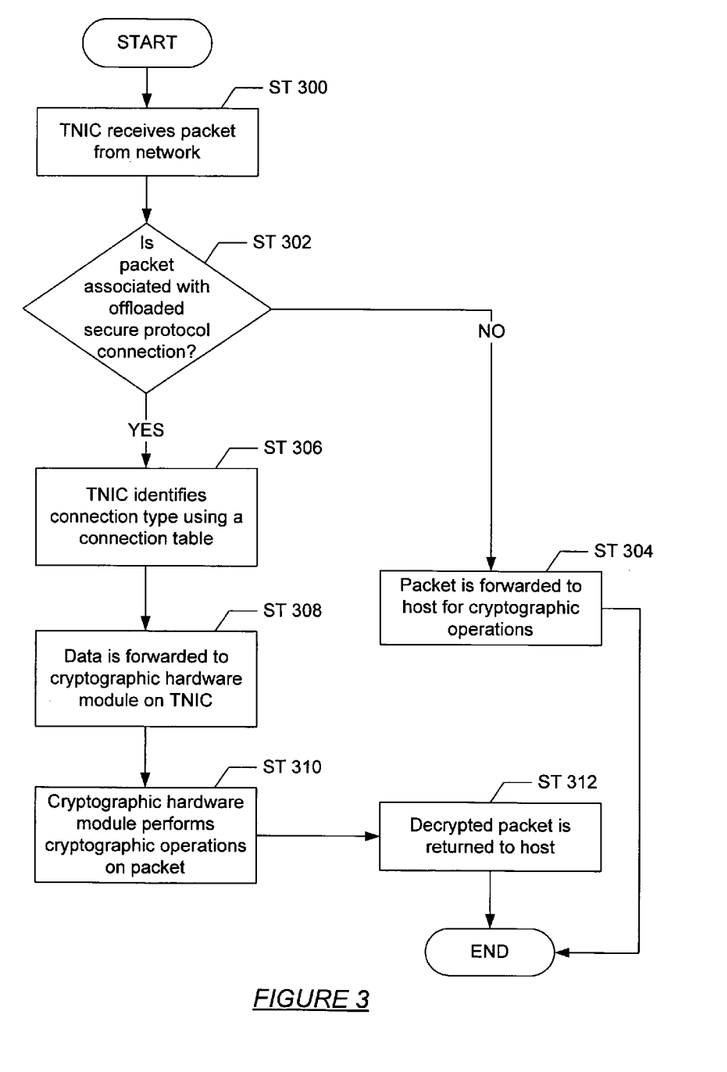
FIG. 3 shows a flow chart for performing the data transfer phase of a secure protocol connection offloaded to the TNIC in accordance with one embodiment of the invention

Once the secure protocol connection is offloaded, the data transfer phase of the secure protocol connection is handled by the TNIC. FIG. 3 shows a flow chart for performing the data transfer phase of a secure protocol connection offloaded to the TNIC in accordance with one embodiment of the invention.

Initially, the TNIC receives a packet from the network (Step 300). Subsequently, a determination is made whether the received packet is associated with an offloaded secure protocol connection (Step 302). In one embodiment of the invention, the received packet is examined to determine if the protocol used is in fact encrypted using a secure protocol. For example, the header associated with the received packet may be examined to determine whether the data is encrypted using a secure protocol. Further, a connection table (such as 110 in FIG. 1B) may be used to determine whether the secure protocol associated with the received packet is also a secure protocol that has been offloaded to the TNIC. For example, state information associated with the secure protocol connection of the received packet may be used to determine if the secure protocol connection is one that the TNIC is handling.

Continuing with FIG. 3, if the received packet is not associated with an offloaded secure protocol connection that is to be handled by the TNIC, then the received packet is forwarded to the host, and the host performs the necessary cryptographic operations to encrypt/decrypt data (Step 304). Alternatively, if the received packet is associated with an offloaded secure protocol connection, then the TNIC uses the connection table to identify the type of connection (Step 306). Specifically, the TNIC reads header information associated with the received packet to determine a connection number and/or a port number, which is then used as an index into the connection table to determine the type of secure protocol connection associated with the received packet. In one embodiment of the invention, the secure protocol connection may be an SSL connection, TLS connection, etc. Those skilled in the art will appreciate that the TNIC may detect a TCP connection first, and then determine that the connection is also a secure protocol connection, such as an SSL connection.

Upon determining the type of secure protocol connection, the TNIC determines which data is to be processed (i.e., the data on which cryptographic operations are to be performed) and forwards the data to the cryptographic hardware module on the TNIC (Step 308). Subsequently, the cryptographic hardware module performs cryptographic operations on the data using the cryptographic key (i.e., the secret key) corresponding to the cryptographic algorithm for the secure protocol data (Step 310). More specifically, the inputs for the cryptographic algorithm performed to decrypt the received packet data is the secure protocol data provided by the protocol offload module and the secret key. In one embodiment of the invention, the cryptographic operations performed on the secure protocol data result in decrypted data, which is subsequently forwarded to the host (Step 312).

Those skilled in the art will appreciate that if the TNIC is ejected at any time during the secure protocol connection (e.g., because the TNIC can no longer handle the offloaded secure protocol connection), then the data transfer phase of the secure protocol connection is handled by the host. Specifically, the host performs cryptographic operations on secure protocol connection data and the sent/received packets are processed via the host's TCP stack in a traditional manner. Further, if the connection is canceled by the TNIC or the kernel of the host, then the offload is likewise canceled.

Those skilled in the art will also appreciate that although FIG. 3 discusses the data transfer phase with respect to a received packet (i.e., the host receiving packet from a remote peer), the process of FIG. 3 similarly applies to the data transfer phase when the host sends data to a remote peer via the TNIC. In this case, the cryptographic operations performed by the TNIC using the secret key result in processed encrypted data, which is subsequently sent to a remote peer via a network.

Figure 4:
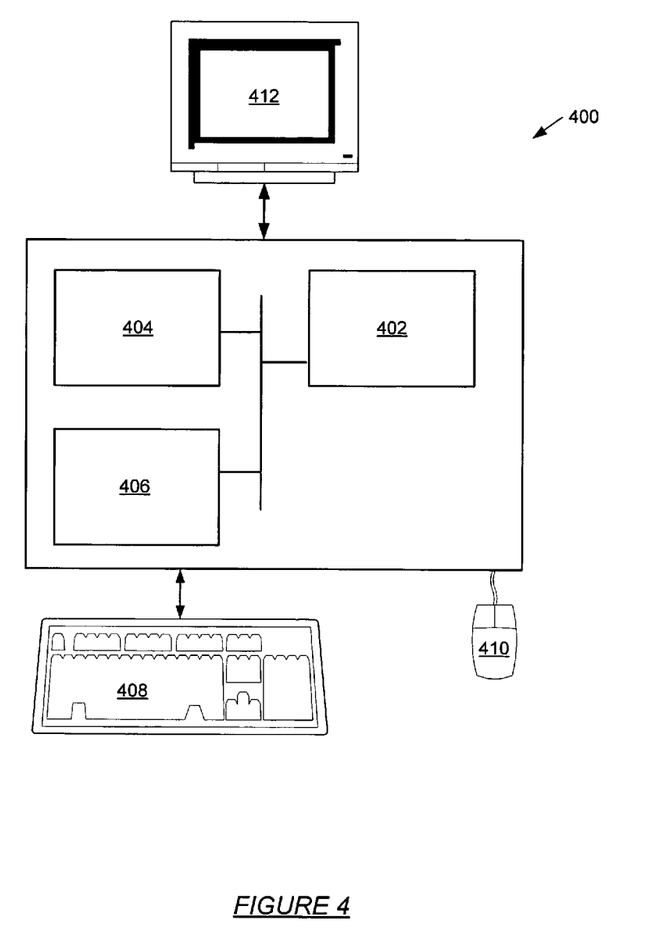
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, software instructions to perform embodiments of the invention may be stored on a computer readable medium such as a compact disc (CD), a diskette, a tape, a file, or any other computer readable storage device.

Embodiments of the invention provide a fast method for processing of secure protocol connections by leveraging hardware cryptographic accelerators. Specifically, embodiments of the invention reduce system overhead by avoiding the scheduling of cryptographic requests for processing by hardware and crossing of the IO bus multiple times by offloading the encryption/decryption of data to the TNIC. Thus, the host application sending and receiving network traffic does not have to encrypt/decrypt data. Further, embodiments of the invention allow the secure protocol traffic to remain visible to applications so that operations that require access to the secure protocol traffic may be performed by host applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for offloading a secure protocol connection, comprising:
   establishing a Transmission Control Protocol/Internet Protocol (TCP/IP) connection between a host system and a remote peer, wherein the TCP/IP connection is maintained by a network interface card (NIC);
   establishing the secure protocol connection between the host system and the remote peer, wherein the secure protocol connection is established over the TCP/IP connection, wherein the secure protocol connection comprises one selected from the group consisting of a secure sockets layer (SSL) connection and a transport layer security (TLS) connection, and wherein the secure protocol connection is established by the host system;
   offloading the secure protocol connection to the NIC to obtain an offloaded secure protocol connection, comprising:
      passing state information associated with the offloaded secure protocol connection to the NIC, wherein the state information comprises the at least one secret key,
      populating a connection table using the state information, and
      storing the at least one secret key in a key store;
   determining that a packet is associated with the offloaded secure protocol connection;
   identifying the offloaded secure protocol connection;
   performing cryptographic operations on the packet using at least one secret key to obtain a processed packet; and
   returning a status of the processed packet to the host system.

2. The method of claim 1, wherein the NIC is a transport network interface card (TNIC).

3. The method of claim 1, wherein identifying the offloaded secure protocol connection comprises looking up a type of secure protocol connection using the connection table.

4. The method of claim 1, wherein establishing the secure protocol connection comprises performing a handshake between the host system and the remote peer, wherein the handshake comprises a key exchange to obtain the at least one secret key.

5. The method of claim 1, wherein cryptographic operations comprise one selected from the group consisting of encrypting secure protocol data sent from the host system and decrypting secure protocol data received from the remote peer.

6. The method of claim 1, wherein the secure protocol connection is offloaded to the NIC using a fast connection offload.

7. The method of claim 1, wherein the host system performs cryptographic operations on the packet if the packet is not associated with the secure protocol connection.

8. A system for offloading a secure protocol connection, comprising:
 a host system configured to:
  establish a Transmission Control Protocol/Internet Protocol (TCP/IP) connection between a host system and a remote peer, wherein the TCP/IP connection is maintained by a network interface card (NIC),
  establish the secure protocol connection between the host system and the remote peer, wherein the secure protocol connection is established over the TCP/IP connection, wherein the secure protocol connection comprises one selected from the group consisting of a secure sockets layer (SSL) connection and a transport layer security (TLS) connection, and wherein the secure protocol connection is established by the host system, and
  obtain an offloaded secure protocol connection by offloading the secure protocol connection to the network interface card, comprising passing state information associated with the offloaded secure protocol connection to the NIC, wherein the state information comprises the at least one secret key, populating a connection table using the state information, and storing the at least one secret key in a key store; and
 the NIC configured to:
  determine that a packet is associated with the offloaded secure protocol connection;
  identify the offloaded secure protocol connection;
  perform cryptographic operations on the packet using at least one secret key to obtain a processed packet; and
  return a status of the processed packet to the host system.

9. The system of claim 8, wherein the NIC is a transport network interface card (TNIC).

10. The system of claim 8, wherein the NIC comprises a protocol offload module, a cryptographic hardware module, and a key store.

11. The system of claim 10, wherein the protocol offload module is configured to parse the packet to determine the data on which cryptographic operations are performed by the cryptographic hardware module.

12. The system of claim 10, wherein the protocol offload module uses a connection table to identify the secure protocol connection associated with the packet.

13. The system of claim 8, wherein the NIC is further configured to process the secure protocol connection using fast offloading of the secure protocol connection.

14. The system of claim 8, wherein cryptographic operations comprise one selected from the group consisting of encrypting secure protocol data sent from the host system and decrypting secure protocol data received from a remote peer.

15. The system of claim 14, wherein a connection is established between the host system and the remote peer using a handshake, wherein the handshake comprises a key exchange to obtain at least one secret key.

16. A computer system for offloading a secure protocol connection, comprising:
 a processor;
 a memory;
 a storage device; and
 software instructions stored in the memory for enabling the computer system under control of the processor, to:
  establish a Transmission Control Protocol/Internet Protocol (TCP/IP) connection between a host system and a remote peer, wherein the TCP/IP connection is maintained by a network interface card;
  establish the secure protocol connection between the host system and the remote peer, wherein the secure protocol connection is established over the TCP/IP connection, wherein the secure protocol connection comprises one selected from the group consisting of a secure sockets layer (SSL) connection and a transport layer security (TLS) connection, and wherein the secure protocol connection is established by the host system;
  offload the secure protocol connection to the network interface card to obtain an offloaded secure protocol connection, comprising:
   pass state information associated with the offloaded secure protocol connection to the NIC, wherein the state information comprises the at least one secret key,
   populate a connection table using the state information, and
   store the at least one secret key in a key store;
  determine that a packet is associated with the offloaded secure protocol connection;
  identify the offloaded secure protocol connection;
  perform cryptographic operations on the packet using at least one secret key to obtain a processed packet; and
  return a status of the processed packet to the host system.

* * * * *

UNITED STATES PATENT AND TRADEMARK OFFICE
CERTIFICATE OF CORRECTION

| | | |
|---|---|---|
| PATENT NO. | : 7,716,730 B1 | Page 1 of 1 |
| APPLICATION NO. | : 11/165870 | |
| DATED | : May 11, 2010 | |
| INVENTOR(S) | : Nicolas G. Droux et al. | |

It is certified that error appears in the above-identified patent and that said Letters Patent is hereby corrected as shown below:

In column 2, line 3, delete "10 bus" and insert -- IO bus --, therefor.

Signed and Sealed this
Fourteenth Day of June, 2011

David J. Kappos
*Director of the United States Patent and Trademark Office*